United States Patent
Akiyama

[19]

[11] Patent Number: 6,076,788
[45] Date of Patent: Jun. 20, 2000

[54] REINFORCED HANGER BAR

[75] Inventor: Steven Randall Akiyama, Park Forest, Ill.

[73] Assignee: Cooper Industries, Houston, Tex.

[21] Appl. No.: 09/100,975

[22] Filed: Jun. 22, 1998

[51] Int. Cl.[7] .................................................. E04G 25/00
[52] U.S. Cl. ................... 248/200.1; 248/201; 248/298.1
[58] Field of Search ................................. 248/200.1, 201, 248/298.1, 342, 343, 909, 225.11, 300

[56] References Cited

U.S. PATENT DOCUMENTS

| | | |
|---|---|---|
| 1,156,885 | 10/1915 | Caine . |
| 1,571,221 | 2/1926 | Wilson ........................... 248/225.11 X |
| 2,316,389 | 4/1943 | Atkinson . |
| 2,658,241 | 11/1953 | Houghton, Jr. et al. . |
| 2,930,564 | 3/1960 | Maier .................................... 248/200.1 |
| 2,933,549 | 4/1960 | Antonucci . |
| 3,102,306 | 9/1963 | Hutchinson . |
| 3,104,087 | 9/1963 | Budnick et al. . |
| 3,162,413 | 12/1964 | Hexdall . |
| 3,609,338 | 9/1971 | Kripp . |
| 3,710,096 | 1/1973 | McFarlin ......................... 248/225.11 X |
| 4,022,415 | 5/1977 | Roderick et al. .................... 248/298.1 |
| 4,040,589 | 8/1977 | McLay .................................... 248/300 |
| 4,391,428 | 7/1983 | Grimes . |
| 4,406,216 | 9/1983 | Hott et al. ............................ 248/343 X |
| 4,511,113 | 4/1985 | Druffel et al. . |
| 4,566,057 | 1/1986 | Druffel . |
| 4,723,747 | 2/1988 | Karp et al. . |
| 4,972,339 | 11/1990 | Gabrius . |
| 5,029,794 | 7/1991 | Wolfe . |
| 5,044,582 | 9/1991 | Walters . |
| 5,045,985 | 9/1991 | Russo et al. . |
| 5,209,444 | 5/1993 | Rinderer ............................... 248/909 X |
| 5,222,800 | 6/1993 | Chan et al. ........................... 362/365 X |
| 5,386,959 | 2/1995 | Laughlin et al. ................. 248/200.1 X |
| 5,505,419 | 4/1996 | Gabrius . |
| 5,588,737 | 12/1996 | Kusmer . |
| 5,690,423 | 11/1997 | Hentz et al. ......................... 248/343 X |
| 5,857,766 | 1/1999 | Sieczkowski ............................ 362/365 |

*Primary Examiner*—Ramon O. Ramirez
*Assistant Examiner*—Gwendolyn Baxter
*Attorney, Agent, or Firm*—Fish & Richardson PC

[57] ABSTRACT

An improved hanger bar assembly includes a first hanger bar member and the plurality of longitudinal elongated slots and a plurality of reinforcing formations. The reinforcing formations being separated from one another by at least one of the slots and those slots being separated from each other by at least one of the reinforcing formations. A second hanger bar member is interfitted with the first hangar bar member, the second hanger bar member having a plurality of spaced retaining projections. At least one of the retaining projections engaging at least one of the slots in order to couple the first and second hanger bar members together in a longitudinally extensible manner.

22 Claims, 7 Drawing Sheets

REINFORCED HANGER BAR

BACKGROUND OF THE INVENTION

1. Field of the Invention

The present invention relates to hanger bars generally. In particular, it relates to a reinforced hanger bar construction, and improved hanger bar assembly, and an improved hanger bar system.

2. Related Art

A support system is often employed to suspend a member between adjacent supports. One example of such a support system is found in recessed lighting assemblies. It is common to suspend a light fixture between two supports or joists by attaching the fixture to a pair of spaced hanger bars. The ends of the hanger bars are then affixed to the supports or joists.

Conventional hanger bars can be of a one-piece construction having a fixed length. Such a construction can be relatively rigid so as to provide good support for the suspended member. However, with this construction the length of the hanger bar cannot be easily adjusted thereby limiting its use to supports or joists having a particular spacing.

Hanger bars of a two-piece construction that have an adjustable length are known. While this construction permits installation between supports or joists of various spacings, they generally suffer from a lack of stability and fail to provide adequate support for the suspended member. This lack of stability and support is even more pronouced when the hanger is installed in its fully extended, or nearly fully extended position.

U.S. Pat. No. 5,505,419 to Gabrius discloses a bar hanger for a recessed lighting system. Each bar hanger is constructed as a one-piece element. The hanger must be broken along a score line in order to change its length. The bar hanger has a stiffening rib that extends along substantially the entire length of the bar hanger.

U.S. Pat. No. 5,029,794 to Wolfe discloses a universal two-piece bar hanger construction. Each element of the bar hanger is identical in construction and has an elongated slot and two retaining projections. A pair of bar hanger elements are nested in a slidable relationship relative to each other.

U.S. Pat. No. 4,723,747 to Karp et al. discloses bar hangers for recessed lighting fixtures. The bar hangers are of a two-piece adjustable construction. Each bar hanger has a longitudinally extended "dome" or projection to facilitate nesting, as well as an elongated slot. On hanger bar element has an arrow-shaped retaining projection while the other hanger bar element has a foot-like retaining projection. These retaining projections are received within elongated slots to couple the hanger bar elements together in an adjustable fashion.

OBJECTS AND SUMMARY

Accordingly, an object of the present invention is to provide an adjustable hanger bar assembly that possess improved strength and stability. A further object is to facilitate interconnection of the hanger bar elements.

The invention includes an improved hanger bar member and hanger bar assembly, as well as an improved hanger bar system including an improved hanger bar member and assembly.

An improved hanger bar member constructed according to the principles of the present invention includes a plurality of longitudinally elongated slots and a plurality of reinforcing formations. The reinforcing formations being separated from each other by at least one of the slots, and the plurality of slots being separated from each other by at least one of the reinforcing formations.

An improved hanger bar assembly according to the present invention includes a first hanger bar member having a plurality of longitudinally elongated slots and a plurality of reinforcing formations. The reinforcing formations being separated from each other by at least one of the slots, and the plurality of slots being separated from each other by at least one of the reinforcing formations. The improved hanger bar assembly further including a second hanger bar member interfitted with the first hanger bar member. The second hanger bar member having a plurality of spaced retaining projections, at least one of the retaining projections engaging at least one of the slots on the first hanger bar member in order to couple the first and second hanger bar members together in a longitudinally extensible manner.

An improved hanger bar system constructed according to the principles of the present invention may include a plurality of the above-described improved hanger bar assemblies spaced from each other, and a suspended member attached to the improved hanger bar assemblies.

DETAILED DESCRIPTION OF THE PREFERRED EMBODIMENTS

Figure 1:
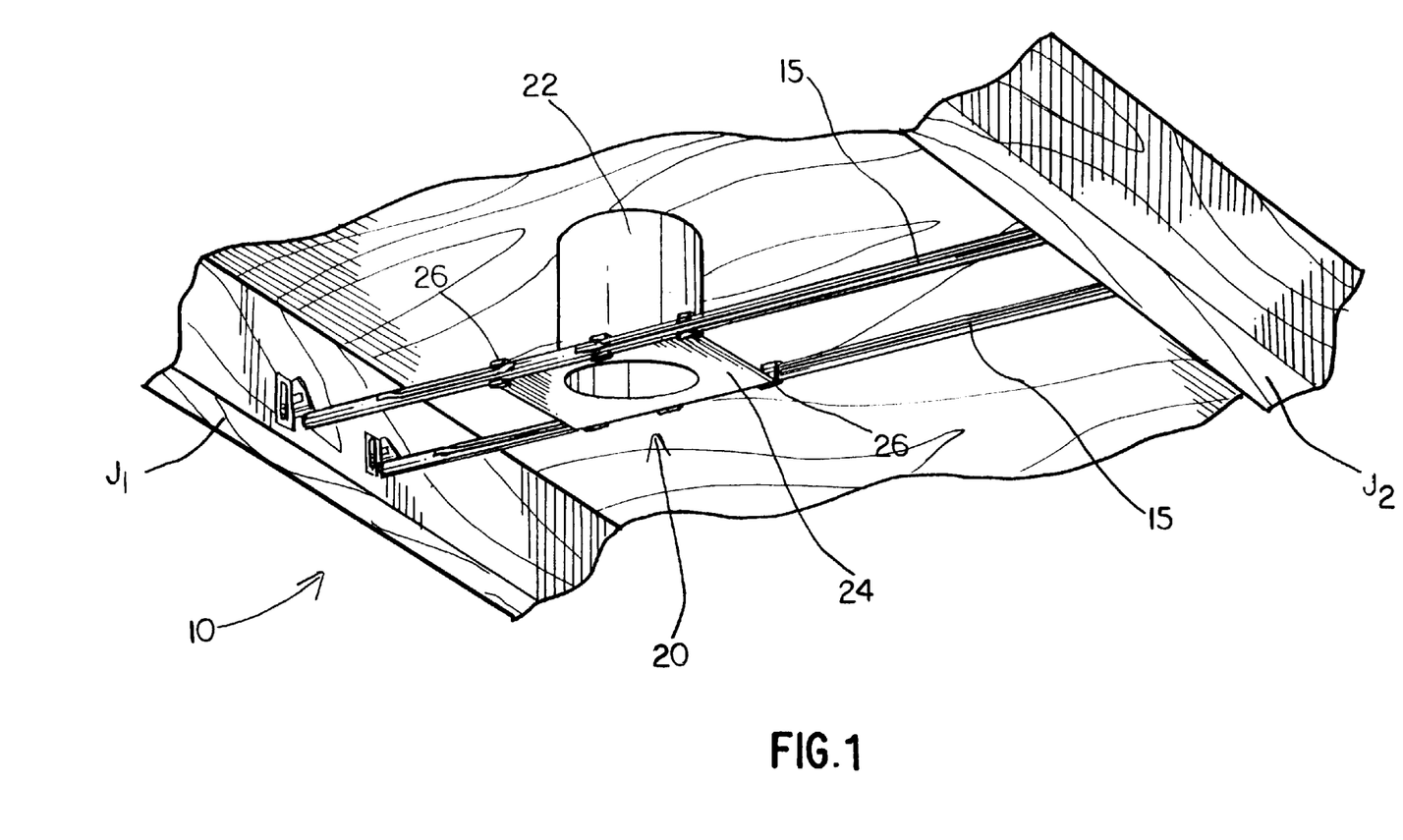
FIG. 1 is a perspective view of a hanger bar system constructed according to the present invention.

An improved hanger bar system constructed in accordance with the principles of the present invention is illustrated in FIG. 1. The improved hanger bar system includes a pair of spaced hanger bar assemblies 15 that are attached to parallel support members or joists J1 and J2. A suspended member 20 is mounted between the hanger bar assemblies 15.

By way of example, the suspended member 20 can comprise a light fixture assembly 22. The light fixture assembly 22 is mounted to the hanger bar assemblies 15 by a plaster plate 24. The plaster plate 24 includes attachments tabs 26 that attach the plaster plate 24 to the hanger bar assemblies 15. The attachment tabs 26 further act to secure each individual hanger bar element of the hanger bar assembly 15 together.

Figure 2:
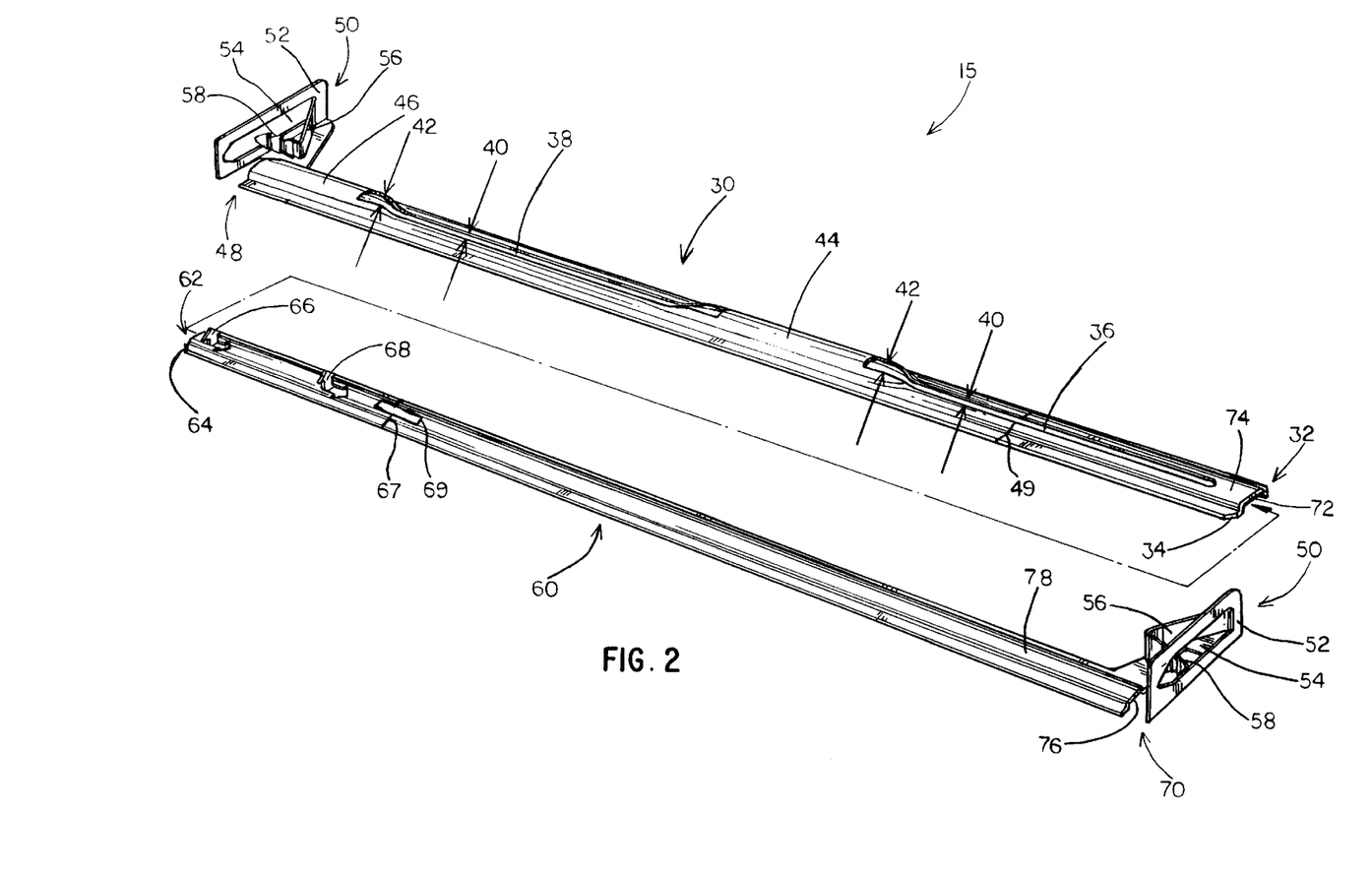
FIG. 2 is an exploded perspective view of a hanger bar assembly including first and second hanger bar elements constructed according to the present invention.

Each hanger bar assembly 15 is of a two-piece construction that is adjustable in a length-wise or longitudinal direction. Each hanger bar assembly 15 comprises two separate hanger bar members 30 and 60, as illustrated in FIG. 2.

The first hanger bar member 30 includes a first end 32 that has chamfered corners 34. The corners 34 can be chamfered at any desired angle. By way of example, the corners can be chamfered at a 45 degree angle relative to the longitudinal direction.

Figure 4:
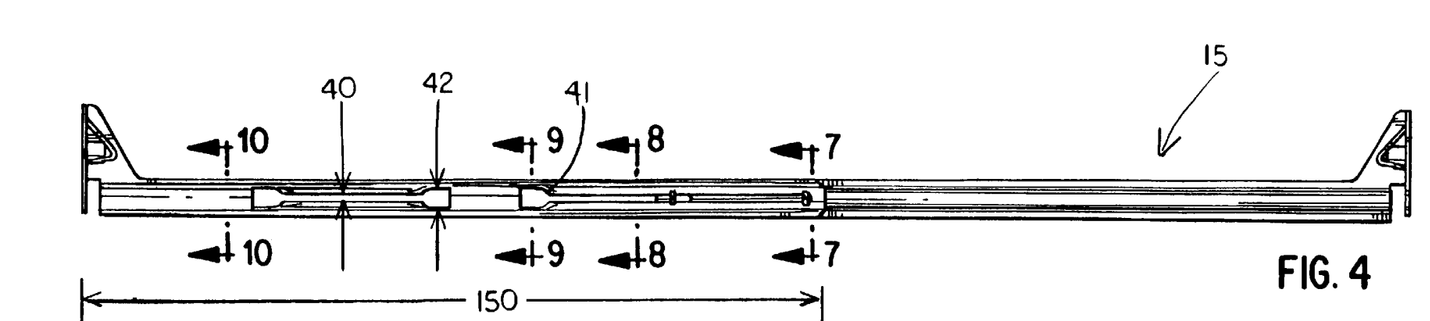
FIG. 4 is a top view of a hanger bar assembly according to the invention in a fully extended position.

First hanger bar member 30 further includes a first elongated slot 36. In its preferred form, first elongated slot 36 has a first width 40 proximate the first end 32 and extending along a substantial portion of its longitudinal dimension. The slot 36 may further comprise a second width 42 which is greater than the first width 40. An angled transitional surface 41 (as illustrated best in FIG. 4) connects the first width 40 with the second width 42. By way of example, the angled surface 41 can be disposed at a 45 degree angle relative to the longitudinal direction as indicated by the angle "∝" in FIG. 4.

A first score line 49 may be formed across the width of the first hanger bar member 30. The precise form and dimensions of the score line 49 can vary widely. In the example illustrated, the score line is a straight line and is approximately 0.02 inches deep. In the event that it becomes necessary to fit between relatively narrowly spaced support members, the first hanger bar member 30 can be broken along first score line 49 to shorten its length.

A first reinforcing formation 44 is provided between the first elongated slot 36 and a second elongated slot 38. As shown, for example, in FIG. 2, the second width 42 of the first slot 36 is preferably provided in the area of the first reinforcing formation 44.

The second elongated slot 38 also includes first width 40, which extends along a substantial portion of the longitudinal dimension of the slot 38, and a second width 42. The second width 42 is provided at both ends of the longitudinal slot 38. A second reinforcing formation 46 is provided that extends from one end of elongated slot member 38 to a second end 48 of the first hanger bar member 30.

An attachment structure 50 is provided at the second end 48. The attachment structure 50 may be integrally formed with the first hanger bar member 30 or may be separately formed and subsequently attached to the second end 48.

One example of an attachment structure 50 is illustrated in FIG. 2. The illustrated example includes an end mounting plate 52 having an aperture 54 disposed therein and an integral tab 56. The free end of the tab 56 includes wedge-shaped serrations 58. The end mounting plate 52 may be cut and folded to form the aperture 54 and tab 56. The attachment structure can be secured to a support member of joist by striking the tab member 56 with a hammer thereby driving the free end into the support member or joist. The wedge shaped serrations facilitate entry of the tab into the support member and also further act to retain the tab within the support member.

A second hanger bar member 60 is provided that nests with the first hanger bar member 30. A second hanger bar member 60 includes a first end 62 which includes chamfered corners 64 similar to the chamfered corners 34 of the first hanger bar member.

Figure 3:
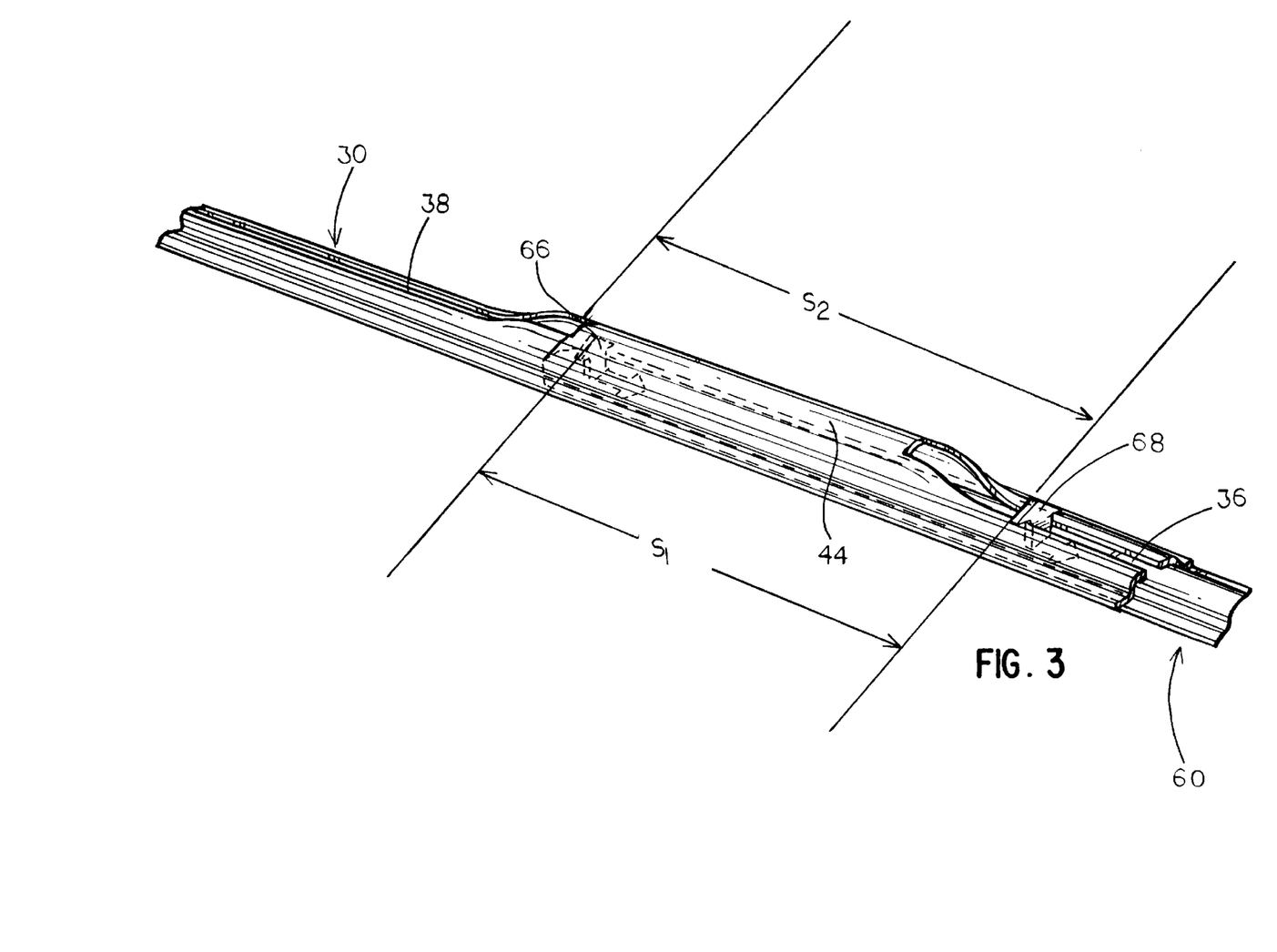
FIG. 3 is a partial perspective view of a hanger bar assembly according to the present invention.

First and second retaining projections 66 and 68 are provided proximate the first end 62. The first and second retaining projections 66 and 68 may be any suitable shape or form. One preferred example is an arrow shape, as illustrated in FIG. 2. The retaining projection 66 and 68 are received within the first and/or second elongated slots 36 and 38 of the first hanger bar member in order to couple the hanger members together in a longitudinal adjustable manner. The head of the retaining projection is greater in width than the first width 40 of slots 36 and 38, but is smaller than the second width 42. Therefore the retaining projections 66 and 68 may be freely inserted through the slots 36 and 38 at the second width 42, but not at the first width 40. As illustrated in FIG. 3, the retaining projections 66 and 68 are dimensioned so as to pass freely through the first and second reinforcing formations 44 and 46 as the first and second hanger bar members 30 and 60 are longitudinally moved relative to each other. The first and second retaining projections 66 and 68 may be cut from the surface of the second hanger bar member 60 and unfolded to provide the form illustrated in FIG. 2. Alternatively, the first and second retaining projections 66 and 68 may be separately formed then attached to the surface of the second hanger bar member 60.

A second score line 67 may be provided across the width of the second hanger bar member 60. As with the first score line 49, the precise form and depth may vary widely according to the material strength and thickness of the hanger bar members. By way of example only, the score line may be a straight line formed to a depth of approximately 0.02 inches. Since second hanger bar member 60 is of a solid cross-section, unlike slotted hanger bar member 30, it is more difficult to break along the score line. Therefore, a scoring window or aperture 69 may optionally be provided in the area of the score line 67 in order to facilitate breakage of the hanger bar member.

In the event that it becomes necessary to fit the hanger bar assembly into a relatively narrow space, the second hanger bar 60 may be broken along score line 67. As shown in FIG. 2, breaking the hanger bar along score line 67 removes the end of the hanger bar 60 having retaining projections 66 and 68. However, the first and second hanger bar members are still adequately retained by the attachment tabs 26 formed on the plaster plate 24.

The second hanger bar member 60 may extend with a uniform cross-section to a second end 70. An attachment structure 50 is provided at the second end 70. As with the first hanger bar member the attachment structure 50 can be of any suitable form. In one preferred form, the attachment structure 50 disposed at the second end 70 has the same construction as the first attachment structure located at second end 48 of the first hanger bar member 30. The elements of the attachment structure 50 have been previously described in connection with the description of first hanger bar member 30.

As mentioned above, the first and second hanger bar members are secured together in a nested manner. In particular, the first hanger bar member 30 has a first surface 72 which faces the second hanger bar 60 when assembled, and a second opposing surface 74. The second hanger bar member 60 includes a third surface 76 which faces away from the first hanger bar 30 when assembled, and a fourth surface 78 which faces the first hanger bar 30. When the first and second hanger bar members are connected, the first and fourth surfaces 72 and 78 are received within each other in a nesting relationship. The second surface 74 faces outwardly (e.g.—away from the suspended member 20) and the third surface 76 faces inwardly (e.g.—toward the suspended member 20).

One advantage of the relatively large width areas 42 is that assembly of the first and second hanger bar members 30 and 60 to each other is facilitated. As previously noted, the retaining projections 66 and 68 may pass freely through the second width 42 without interference.

One possible method of assembly is described as follows. The second retaining projection 68 is first passed through the second width 42 proximate the second reinforcing formation 46. The second hanger bar 60 is then moved back relative to the first hanger bar member 30 in the direction of the first end 32. The second retaining projection 68 then travels and is engaged in the first width 40 of the second slot 38. The first retaining projection 66 is subsequently inserted through the second width 42 proximate the second reinforcing formation 46. As the second hanger bar member 60 is moved continually toward the first end 32, the first retaining projection 66 will then engage second elongated slot 38 in a similar fashion thereby securing the first and second hanger bar members 30 and 60.

Figure 5:
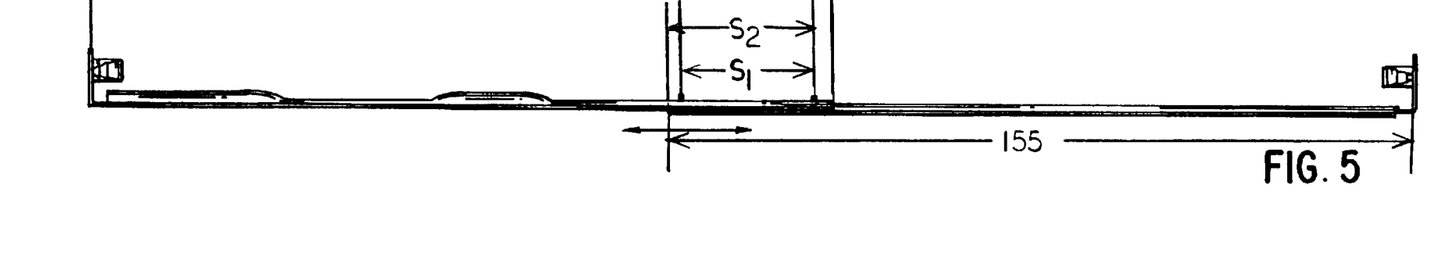
FIG. 5 is a side view of the hanger bar assembly of FIG. 4.
Figure 6A:
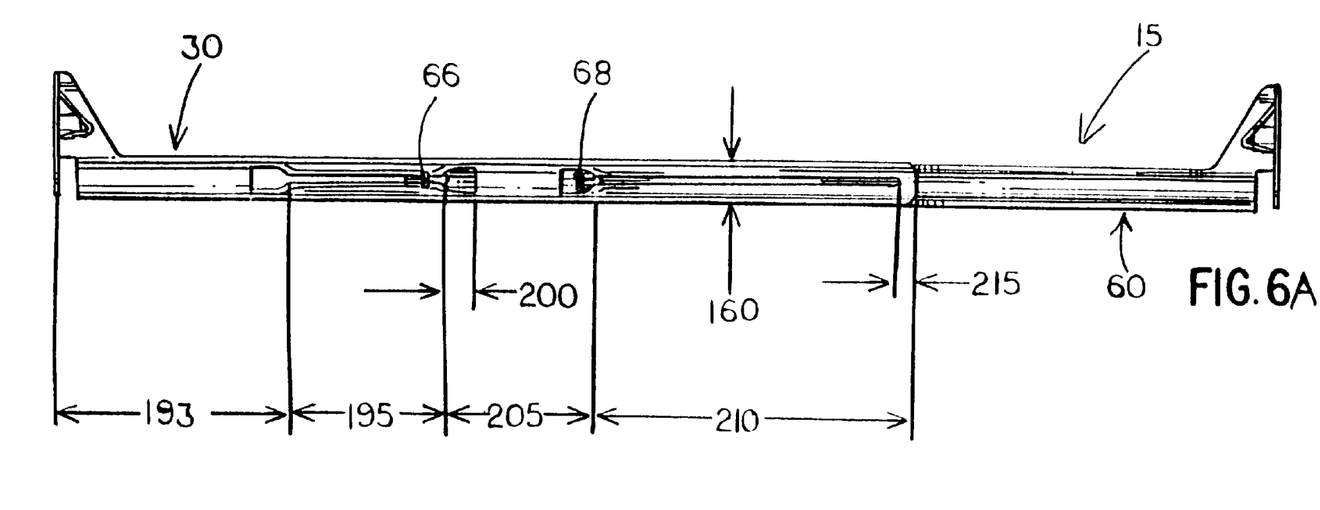
FIG. 6A is a top view of a hanger bar assembly according to the invention in a partially extended position.
Figure 6B:
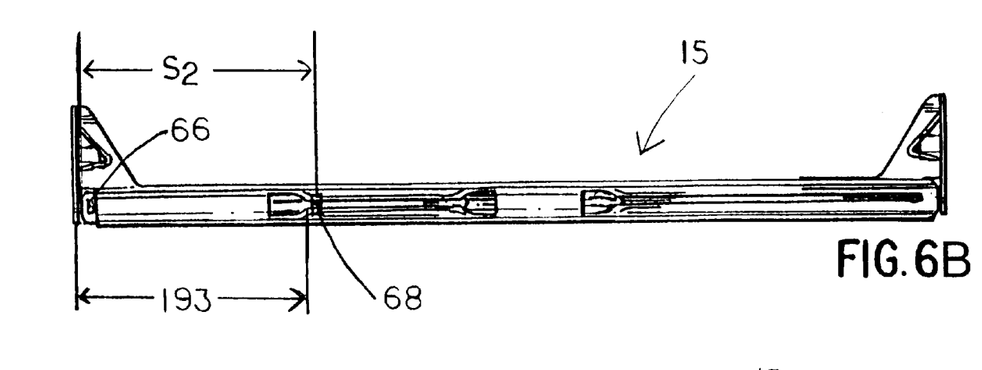
FIG. 6B is a top view of a hanger bar assembly according to the invention in a fully retracted position.

Once the first and second hanger bar members 30 and 60 are connected, the resulting hanger bar assembly 15 is freely adjustable in a length-wise or longitudinal direction. The hanger bar assembly 15 is shown in its fully extended position in FIGS. 4 and 5. FIG. 6A shows the hanger bar assembly 15 in a partially extended position. FIG. 6B shows the hanger bar assembly 15 in its fully retracted position. One particularly advantageous aspect of the present invention is that as the first and second hanger bar members 30 and 60 are moved relative to each other at least one retaining projection is engaged within one of the elongated slots 36 and 38 at all times. This construction is made possible by providing the first and second retaining projections 66 and 68 with a predetermined spacing $S_1$ (as shown, for example, in FIG. 3). Preferably, the predetermined spacing $S_1$ is made at least slightly larger than the distance between the first width regions 40 of the first and second elongated slots 36 and 38 which are separated by the first reinforcing formation 44. This dimension is illustrated as reference element 205 in FIG. 6A.

As illustrated in FIG. 6B, when the hanger bar assembly 15 is in its fully retracted or collapsed condition, the second retaining projection 68 is maintained in engagement with the first width 40 of slot 38 by providing a predetermined spacing $S_2$ which extends from the second retaining projection 68 to the first end 62 of the second hanger bar member 60. This predetermined spacing $S_2$ is greater than the distance between the first width 40 of the second elongated slot 38 and the end mounting plate surface 52 of the first hanger bar member. This dimension is indicated by element 193 in FIGS. 6A and 6B.

Figure 7:
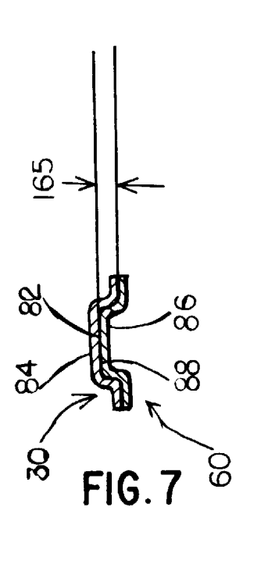
FIG. 7 is a cross-sectional view taken along line 7—7 of FIG. 4.

The cross-sectional details of the hanger bar assembly according to the present invention are best illustrated in FIGS. 7–10. FIG. 7 shows the first and second hanger bar members 30 and 60 in a nested relationship. As previously described and illustrated in FIG. 2, the first hanger bar member 30 has a first surface 72 and a second surface 74. The first surface 72 has a generally concave groove 82 disposed along a substantial portion of the longitudinal length of the first hanger bar member 30. The second surface 74 has a generally convex ridge 84 corresponding to the concave groove 82 formed on said first surface. The third surface 76 of second hanger bar member 60 has a generally concave groove 86 extending along a substantial portion of longitudinal length of the second hanger bar member 60. The second hanger bar member 60 further has a generally convex ridge 88 disposed on the fourth surface 78 corresponding to the concave groove 86. As illustrated in FIG. 7, the generally convex ridge 88 is received in the generally concave groove 82 in a nested manner.

Figure 8:
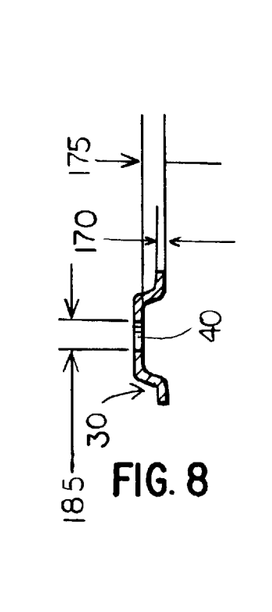
FIG. 8 is a cross-sectional view taken along line 8—8 of FIG. 4.
Figure 9:
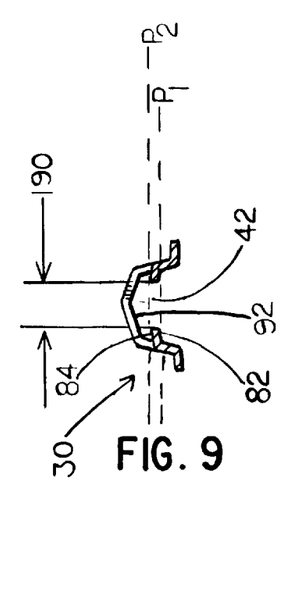
FIG. 9 is a cross-sectional view taken along line 9—9 of FIG. 4.
Figure 10:
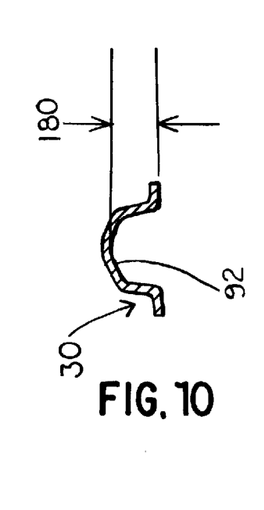
FIG. 10 is a cross-sectional view taken along line 10—10 of FIG. 4.

FIG. 8 is a cross-sectional view of the first hanger bar member 30 showing the first width 40 of the elongated slot. FIG. 9 is a cross-sectional view of the first hanger bar member 30 showing the second width 42 of the elongated slot and just prior to a reinforcing formation. FIG. 10 is cross-sectional view of the first hanger bar member 30 showing a reinforcing formation in an area which does not include any elongated slot.

The first and second reinforcing formations 44 and 46 each have a generally concave reinforcing depression 92 disposed along first surface 72 and a generally convex reinforcing protrusion or ridge formed along the second surface 74. As illustrated for example in FIG. 9, the generally concave groove 82 which extends along a substantial portion of the first hanger bar member 30 defines a first plane P1. By comparison, the generally concave reinforcing depressions 92 extend beyond the plane P1 and are therefore formed deeper into the first hanger bar member 30. Similarly, the generally convex ridge 84 which extends along a substantial portion of the longitudinal length of the first hanger bar member 30 defines a second plane P2. The reinforcing protrusion 94 extends beyond plane P2 so as to project further from the surface of the first hanger bar member 30.

Figure 11:
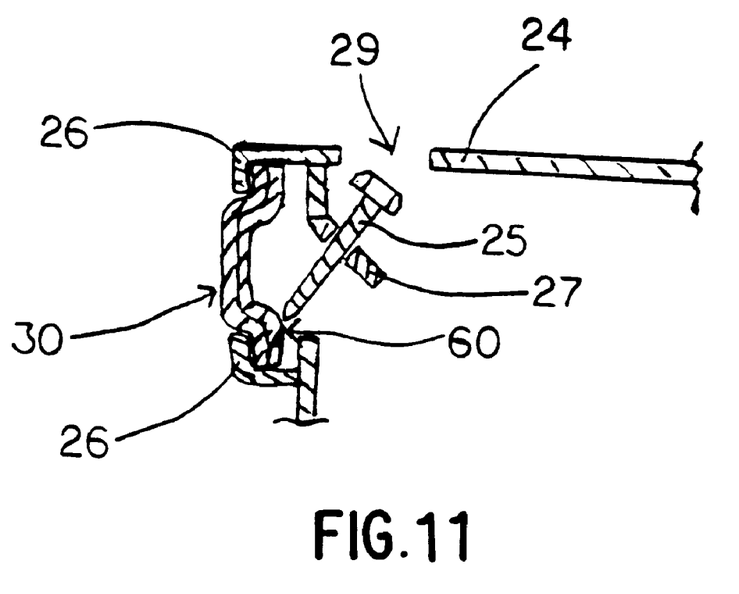
FIG. 11 is a partial sectional view of a securing arrangement for a hanger bar system constructed according to the invention.

Another aspect of the present invention is illustrated in FIG. 11. A securing arrangement may be provided for the hanger bar system that fixes the position of the first and second hanger bar members 30 and 60 to each other, as well as fixes the position of the hanger bar assemblies 15 relative to the suspended member. One example of such an arrangement is shown in FIG. 11. The plaster plate 24 has attachment tabs 26 that retain the first and second hanger bars 30 and 60. A securing fastener 25, such as a threaded screw, is received in an aperture of a guide flange member 27. An aperture 29 is provided in the plaster plate to provide access to the securing fastener 25. As the securing faster is tightened, it comes into contact with a surface of the second hanger bar member 60. As a result of this contact, the first and second hanger bars 30, 60 come into firmer engagement with each other as well as with the attachment tabs 26. Therefore this increased contact pressure prevent the first and second hanger bar members from moving relative to each other, as well as preventing the hanger bar members 30, 60 from moving relative to the attachment tabs 26 and the plaster plate 24.

Only preferred embodiments of the invention are specifically illustrated and described herein. It should be appreciated that numerous modifications and variations of the present invention are possible in light of the present disclosure, such modifications and variations being encompassed within the scope of the appended claims without departing from the spirit an scope of the present invention.

What is claimed is:

1. A hanger bar assembly comprising:
   a first hanger bar member having a plurality of slots elongated in a longitudinal direction, and a plurality of reinforcing formations, said reinforcing formations being separated from each other in the longitudinal direction by at least one of said slots, said plurality of slots being separated from each other in the longitudinal direction by at least one of said reinforcing formations;
   a second hanger bar member interfitted with said first hanger bar member, said second hanger bar member having a plurality of spaced retaining projections, at least one of said slots on the first hanger bar member being engaged by one of said projections at all times in order to couple said first and second hanger bar members together in a longitudinally extensible manner.

2. The hanger bar assembly of claim 1, wherein:

said first hanger bar member has a first attachment structure located at an end thereof; and said second hanger bar member has a second attachment structure located at an end thereof.

3. The hanger bar assembly of claim 1, wherein:

said first hanger bar member has a first surface and a second surface, said first surface having a generally concave groove disposed along a substantial portion of the longitudinal length of said first hanger bar member, said second hanger bar members has a third surface and a fourth surface, said fourth surface having a generally convex ridge disposed along a substantial portion of the longitudinal length of said second hanger bar member; and said convex ridge formed on said fourth surface being slidably received within said concave groove formed on said first surface.

4. The hanger bar assembly of claim 3, wherein:

said second surface has a generally convex ridge corresponding to said concave groove formed on said first surface; and said third surface has a generally concave groove corresponding to said convex ridge formed on said fourth surface.

5. The hanger bar assembly of claim 1, wherein:

said first hanger bar member has a first surface and a second surface; and said plurality of slots extend through said first and second surfaces thereby defining a plurality of longitudinally elongated apertures through said first hanger bar member.

6. The hanger bar assembly of claim 1, wherein:

said first hanger bar member has a first chamfered end portion; and said second hanger bar member has a second chamfered end portion.

7. The hanger bar assembly of claim 1, wherein:

said slots define a first width along a major portion of the longitudinal length thereof;

said slots define a second width in at least an area adjacent to said reinforcing formations; and said second width is greater than said first width.

8. The hanger bar assembly of claim 1, wherein:

said second hanger bar member has a first surface and a second surface; and said retaining projections extend from said second surface and fit within said slots formed on said first hanger bar member.

9. The hanger bar assembly of claim 1, wherein:

said retaining projections are spaced from each other by a first predetermined distance; and said first distance is such that at least one retaining projection is engaged by at least one slot at all times as said first and second hanger bar members are longitudinally displaced relative to one another.

10. The hanger assembly of claim 1, wherein:

said first hanger bar member has a first score line across its width;

said second hanger bar member has a second score line across its width; and said second hanger bar member has a break aperture at least in the area of said second score line in order to facilitate breaking of said second hanger bar member at said second score line.

11. The hanger bar assembly of claim 1, wherein said first and second hanger bar members are constructed of galvanized steel.

12. A hanger bar system comprising a plurality of said hanger bar assemblies of claim 1, wherein said plurality of spaced hanger bar assemblies are in a spaced arrangement, and a suspended member is attached to said spaced hanger bar assemblies.

13. The hanger bar system of claim 14, wherein said suspended member is attached to said space hanger bar assemblies by a plurality of attachment tabs.

14. The hanger bar system of claim 15, wherein said suspended member comprises a light fixture assembly.

15. The hanger bar system of claim 16, wherein said light fixture assembly comprises a plaster plate.

16. The hanger bar system of claim 14, wherein said suspended member includes a securing arrangement that locks the position of said suspended member relative to said plurality of hanger bar assemblies.

17. The hanger bar system of claim 14, wherein said suspended member includes a securing arrangement that locks the position of said first and second hanger bar members relative to each other.

18. The hanger bar assembly of claim 1, wherein a reinforcing formation comprises one or more portions raised from a plane in which the slots are defined.

19. The hanger bar assembly of claim 1, wherein a reinforcing formation comprises one or more portions recessed from a plane in which the slots are defined.

20. The hanger bar assembly of claim 1, wherein the first hanger bar member is substantially longer in the longitudinal direction than in a transverse direction that is perpendicular to the longitudinal direction.

21. A hanger bar assembly comprising:

a first hanger bar member having a plurality of longitudinally elongated slots, and a plurality of reinforcing formations, said reinforcing formations being separated from each other by at least one of said slots, said plurality of slots being separated from each other by at least one of said reinforcing formations; and a second hanger bar member interfitted with said first hanger bar member, said second hanger bar member having a plurality of spaced retaining projections, at least one of said slots on the first hanger bar member being engaged by one of said projections at all times in order to couple said first and second hanger bar members together in a longitudinally extensible manner;

wherein:

said first hanger bar member has a first surface and a second surface, said first surface having a generally concave groove disposed thereon, said generally concave groove defining a first plane; and said first surface has a plurality of generally concave reinforcing depressions formed thereon, said reinforcing depressions defining, at least in part, at least a respective one of said reinforcing formations, and said reinforcing depressions extending beyond said first plane.

22. A hanger bar assembly comprising:

a first hanger bar member having a plurality of longitudinally elongated slots, and a plurality of reinforcing formations, said reinforcing formations being separated from each other by at least one of said slots, said plurality of slots being separated from each other by at least one of said reinforcing formations; and a second hanger bar member interfitted with said first hanger bar member, said second hanger bar member having a plurality of spaced retaining projections, at least one of said slots on the first hanger bar member being engaged by one of said projections at all times in order to couple said first and second hanger bar members together in a longitudinally extensible manner;

wherein:

said first hanger bar member has a first surface and a second surface, said second surface having a generally convex ridge disposed thereon, said generally convex ridge defining a second plane; and said second surface has a plurality of generally convex reinforcing protrusions formed thereon, said reinforcing protrusions defining, at least in part, at least a respective one of said reinforcing formations, and said reinforcing protrusions extending beyond said second plane.

* * * * *